United States Patent
Kölle et al.

[11] Patent Number: 5,694,435
[45] Date of Patent: Dec. 2, 1997

[54] DIGITAL METHOD OF DETECTING PULSES OF SHORT DURATION AND ARRANGEMENT FOR IMPLEMENTING THE METHOD

[75] Inventors: Hans-Georg Kölle, Merklingen; Günter Wolf, Ulm, both of Germany

[73] Assignee: Deutsche Aerospace AG, Munich, Germany

[21] Appl. No.: 360,323

[22] Filed: Dec. 21, 1994

[30] Foreign Application Priority Data

Dec. 23, 1993 [DE] Germany ............... 43 44 022.3

[51] Int. Cl.⁶ ............... G01R 23/14; G01S 7/28
[52] U.S. Cl. ............... 375/342; 375/239; 329/313
[58] Field of Search ............... 375/237–239, 375/342, 353; 329/313; 332/112–113, 115–116

[56] References Cited

U.S. PATENT DOCUMENTS

| | | | |
|---|---|---|---|
| 3,823,377 | 7/1974 | Keane et al. | 375/239 |
| 4,038,540 | 7/1977 | Roberts | 375/342 X |
| 4,635,277 | 1/1987 | Blake et al. | 375/342 X |
| 4,768,207 | 8/1988 | Sejourne et al. | 375/239 |
| 4,777,450 | 10/1988 | Rogers | 329/343 |
| 4,794,543 | 12/1988 | Enein et al. | 364/486 |
| 4,972,441 | 11/1990 | Roberts et al. | 375/342 |

FOREIGN PATENT DOCUMENTS

| | | |
|---|---|---|
| 3213430 | 10/1983 | Germany . |
| 3223565 | 12/1983 | Germany . |

*Primary Examiner*—Young T. Tse
*Attorney, Agent, or Firm*—Spencer & Frank

[57] ABSTRACT

The invention relates to a digital method of detecting pulses of short duration and an arrangement for implementing the method. A threshold value is generated by means of a statistical procedure which is common in radar engineering, by means of which short pulses to be detected can be differentiated as opposed to long pulses. The method includes sorting a predeterminable number of temporally consecutive signal samples by amplitude and creating a ranking of the signal samples. An associated amplitude value for a predeterminable rank within the ranking is determined and multiplied by a predeterminable weighting factor (k) so that an amplitude threshold value (SW) is generated. All signal samples whose amplitude is greater than the amplitude threshold value (SW) are then marked with a marking signal.

10 Claims, 1 Drawing Sheet

DIGITAL METHOD OF DETECTING PULSES OF SHORT DURATION AND ARRANGEMENT FOR IMPLEMENTING THE METHOD

CROSS REFERENCE TO RELATED APPLICATIONS

This application claims the right of priority with respect to German application P 43 44 022.3 filed in Germany on Dec. 23, 1993, the disclosure of which is incorporated herein by reference.

BACKGROUND OF THE INVENTION

The invention relates to a method of detecting pulses of short duration wherein only pulses whose pulse duration is shorter than an associated predeterminable pulse duration threshold value and whose pulse amplitude is greater than an associated, predeterminable amplitude threshold value are detected and on an arrangement for implementing the method.

In the field of communication engineering, particularly in radar engineering, it is necessary in many cases to detect, i. e., to recognize and/or mark, short pulses with a certain length variation. In this process, the short pulses should be reliably recognized when the interference interval, or signal to noise (S/N) ratio, is very small and/or when pulses of long duration are present.

For these kinds of detections, it is known nowadays to use a high-pass filter having a suitably selected lower threshold frequency as well as a threshold amplitude circuit switched downstream, e.g., for the suppression of the amplitude noise.

In such a method, the threshold frequency and the threshold amplitude can only be altered in a disadvantageous manner by means of a high degree of technical complexity, particularly in cases where these values must be changed within a wide range and within a short period of time.

This disadvantage can be avoided by means of a filter bank containing a plurality of individual filters with a respective fixedly set threshold frequency as well as by means of a controlled threshold amplitude switch with associated control circuit. Such a method is also technically complex and therefore costly in a disadvantageous manner.

SUMMARY OF THE INVENTION

It is an object of the invention to provide a generic method which makes it possible to select the pulse lengths of the pulses to be detected within wide margins and also to simultaneously detect short pulses of varying duration by means of one and the same parameterization of the method and which is cost-effective and reliable in its implementation. It is also an object of the invention to provide an arrangement for implementing such a method.

The above and other objects are accomplished in accordance with the invention by the provision of a digital method of detecting pulses of short duration, wherein only pulses having a pulse duration shorter than an associated predeterminable pulse duration threshold and a pulse amplitude greater than an associated, predeterminable amplitude threshold, are detected, comprising: sorting a predeterminable number of temporally consecutive signal samples by amplitude; creating a ranking of the signal samples; determining an associated signal samples for a predeterminable rank within the ranking; multiplying the associated signal sample of the determining step by a predeterminable weighting factor (k) so that an amplitude threshold value (SW) is generated; and marking all signal samples whose amplitude is greater than the threshold value (SW).

A first advantage of the invention is that the method allows the simultaneous detection of short pulses of different lengths by means of one and the same setting.

A second advantage of the invention is that essentially clock-controlled electronic components and/or modules are used. By changing the clock frequency it is possible to adapt the pulse length to be detected within a wide range.

A third advantage is that setting time which otherwise occurs with a filter, does not occur so that a fast change of and/or adaptation to changing parameters, e. g., erratically changing amplitude noise, is possible.

A fourth advantage is that, within wide margins, the threshold amplitude is automatically adapted to the changing amplitude of the noise.

A fifth advantage is that the circuit arrangement can be implemented with few modules in integrated technology so that a light, mechanically robust, reliable as well as cost-effective arrangement is possible.

The invention is based on a method using ordered statistics. Such a method is known from radar engineering and is generally used there for so-called constant false alarm rate (CFAR) methods. Such a method is disclosed in, for example, German Patent No. DE 32 13 430 C2.

With such a method it is possible in a surprising manner to construct a detector for pulses with a predeterminable maximum pulse duration.

Further objects, advantages, and features will become apparent from the ensuing detailed description when considered in conjunction with the accompanying drawings.

DETAILED DESCRIPTION OF THE PREFERRED EMBODIMENT

Figure 1:
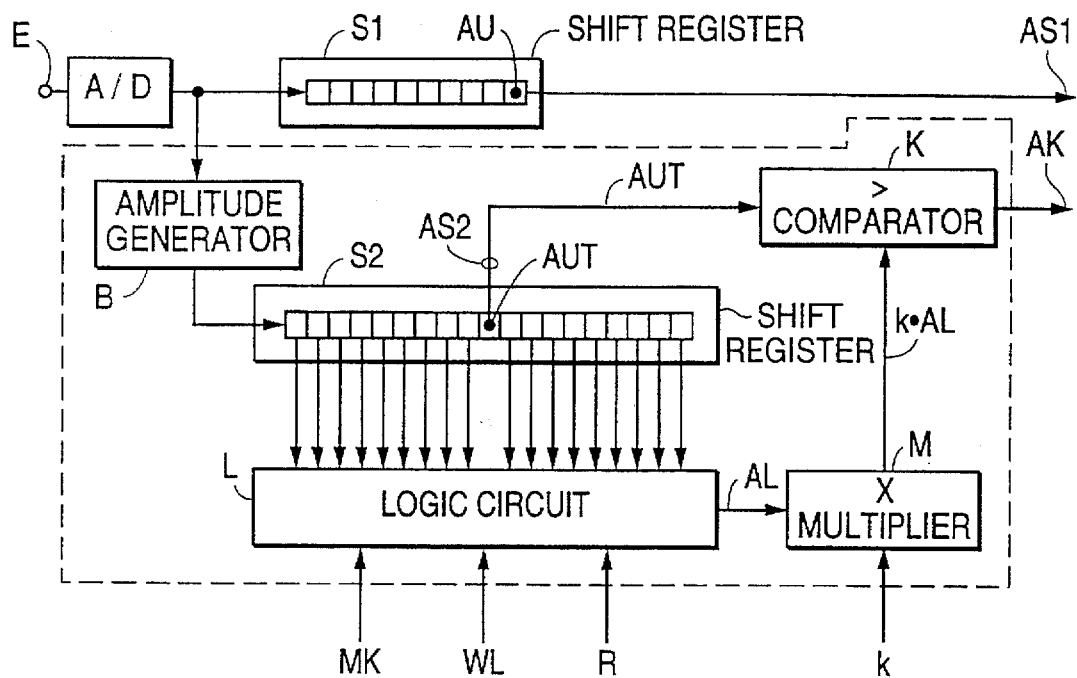
FIG. 1 is a block diagram of a circuit for implementing the invention.

FIG. 1 shows a schematically illustrated circuit arrangement, wherein a complex analog input signal is applied to an input E of an analog/digital converter A/D. At the output of analog/digital converter A/D an associated digitally sampled, complex-valued input signal is created, preferably consisting of temporally equidistant sampled values. In this process, the sampling rate is selected in accordance with the sampling theorem. The digital input signal reaches a clocked, first shift register S1, which has, for example, a 10-stage configuration, and which only acts as a clocked delay line. In the last memory cell of first register S1, i.e. the tenth stage in this example, there is applied a so-called signal under test AU. Signal AU is simultaneously applied to an output AS1 of first shift register S1. This signal under test AU is examined to determine whether the signal is part of a short pulse which can extend over several signal samples. This examination is effected with a circuit arrangement which is framed by a broken line in FIG. 1. This circuit arrangement essentially corresponds to that described in German Patent No. DE 32 13 430 C2.

In FIG. 1, the complex-valued digital signal at the output of analog/digital converter A/D is fed to an amplitude generator (magnituder) B whose output is connected to an input of a second shift register S2. Second shift register S2 is clocked with the same clock as analog/digital converter A/D as well as first shift register S1, but it is provided with considerably more memory cells, 19 in this example. Second shift register S2 has an output AS2 connected to a first input of a comparator K and which corresponds to the memory cell, here the tenth memory cell, to which the first output AS1 of the first shift register S1 which is connected.

The amplitude signals stored in the memory cells, with the exception of the output cell AS2, of second shift register S2 are sorted by amplitude in a logic circuit L so that a ranking is created. Such a sorting method is disclosed, for example, in German patent No. DE 32 23 565. Thus, each amplitude can be assigned a rank in the sequence, which, for example, includes 18 ranks in this case. The smallest amplitude, for example, is in rank 1 and the largest amplitude is in rank 18. The logic circuit L can now be prompted with the aid of a rank selector R to output an amplitude signal which corresponds to the selected rank, e.g., rank 5, at its output AL. This amplitude signal reaches a first input of a multiplier M at whose second input a threshold value multiplier signal k (weighting factor) is applied. The output signal (amplitude threshold value) k.AL of multiplier M is led to a second input of comparator K which examines whether the (output amplitude) signal AUT (first input) is larger than the signal k.AL (second input). If this is the case, a marking signal (flag signal) is generated at the comparator output AK. The marking signal and output signal AU of the first shift register S1 are simultaneously present at outputs AK and AS1. Here, a pulse that is to be detected may consist of several signal samples. The signal k.AL determines an (amplitude) threshold value SW whose temporal behavior is illustrated in FIG. 2 by a broken line as further described below in greater detail.

In FIG. 1, the logic circuit L is provided with further inputs WL and MK. Input WL (window length) can select the number of actually considered memory cells in the second shift register S2, i.e., a number that is smaller than the maximum number (here: 18) of the possible memory cells for the determination of the ranking.

Thus, with the assistance of inputs WL and WK, a degeneration window can be generated which can be shifted or thinned by means of input MK (masking) with respect to cell AS2 which corresponds to the cell under test AUT. In this manner it is possible, e.g., to position the window so that the (output) cell AS2 is not positioned in the center of the window and the cell under test, for example AUT, does not have to be considered in the sorting procedure.

Figure 2:
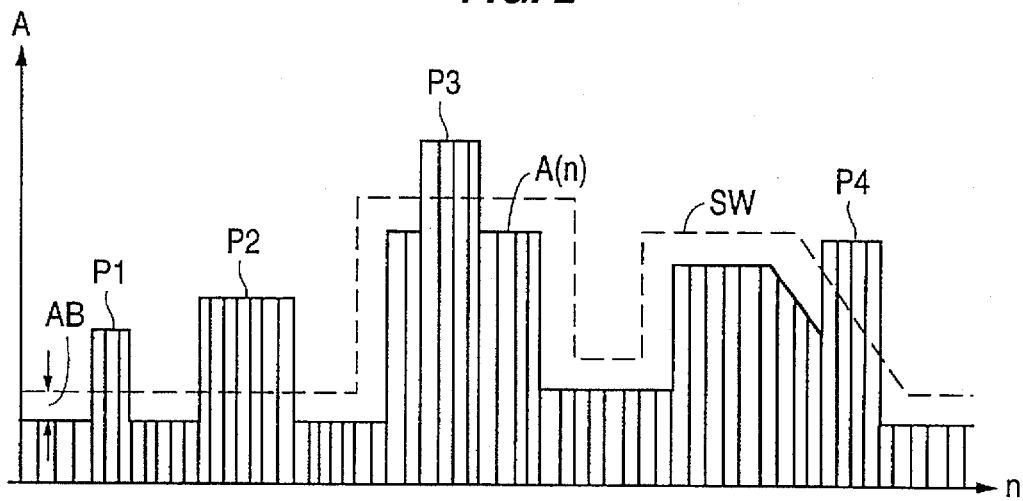
FIG. 2 is a diagram used to explain the invention.

FIG. 2 shows, by way of example, a signal at the output of the amplitude generator (magnituder) B (FIG. 1) which has its amplitude A plotted as a function of the running index n of the sampled signals. Since the signal samples are determined in a temporally equidistant manner, the abscissa may also be considered the time axis. The amplitude function A(n), which is dependent on the digital time n, comprises a superimposition of noise and/or pulses of long duration with pulses (P1, P2, P3, P4), of short and medium-length duration which are to be detected.

It is now possible in a surprising manner to select the parameters, including threshold-multiplier k, rank R, length of window WL, and masking MK, so that the time behavior of the threshold signal SW=k.AL has the course that is illustrated by the dashed line. It is characterized by the fact that a determinable and adjustable distance AB is always maintained relative to the noise and the long pulses and that the time behavior of the threshold signal SW corresponds to that of the noise and the long pulses. In such a threshold signal SW, the short pulses P1 and the medium-length pulses P2, P3, P4 are reliably detectable in that for each signal sample under test AU an associated marking signal (flag signal) is generated at the comparator output AK.

The parameters mentioned above k, R, WL, MK and the number of memory cells in the shift registers S1, S2 and the clock frequency used for these are, for example, experimentally adaptable to an input signal to be expected, for example, a radar signal.

The following formulas apply to this embodiment $$2 \leq W \leq N \text{ and } 1 \leq P \leq W/2,$$

where

N=maximum number of memory cells of the second shift register S2;

W=number of memory cells contained in a window; and

P=length of a short pulse to be detected (in units of memory cells=number of signal samples of a pulse).

It is obvious that the detectable time lengths of a pulse P are given by $$\frac{1}{F_{takt}} \leq P = \frac{W/2}{F_{takt}}$$

where:

$F_{takt}$=clock frequency.

Such a detector for short pulses, also called SPD (short pulse detector), can be used in many fields of communication engineering, for example, in radar engineering for target recognition (short pulse P with variable length) in surrounding of clutter.

The invention is not limited to the embodiment described but can be applied, by analogy, to further embodiments, for example, for the detection of short interference pulses with variable length (so-called glitches) in a series of pulses whose (useful) pulses must then be considered as long pulses.

Such exemplary applications are listed in the following table:

| short and/or medium-length pulse to be detected | long pulse not to be detected |
|---|---|
| interference pulse | useful pulse |
| target | clutter |
| useful pulse | interference pulse/ interference surrounding |
| foreign pulse | intrinsic pulse |
| intrinsic pulse | foreign pulse |

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A digital method of detecting pulses of short duration in a complex-valued digital input signal, wherein only pulses having a pulse duration shorter than an associated predeterminable pulse duration threshold and a pulse amplitude greater than an associated, predeterminable amplitude threshold, are detected, comprising:

sorting a predeterminable number of temporally consecutive signal samples by amplitude;

creating a ranking of the signal samples;

determining an associated signal sample for a predeterminable rank within the ranking;

multiplying the associated signal sample of said determining step by a predeterminable weighting factor (k) so that an amplitude threshold value (SW) is generated; and marking all signal samples whose amplitude is greater than the amplitude threshold value (SW).

2. A method according to claim 1, wherein said creating step includes:

storing a predeterminable number (N) of amplitude values in a clocked memory (S2) on a temporally consecutive basis;

selecting an amplitude value under test (AUT) from the stored amplitude values; and determining the ranking from the remaining amplitude values.

3. A method according to claim 2, wherein the clocked memory (S2) of said storing step contains a predeterminable number of possible memory locations for the storage of the predeterminable numbers (N) of amplitude values, and said method further includes:

combining a plurality of the memory locations in a window having a window length WL smaller than N; and selecting a location of the window, with regard to the amplitude value under test (AUT), the window length WL and a selection of values from the window as a function of at least one of the short pulses to be detected and the complex-valued digital input signal.

4. Method according to claim 3, further comprising:

delaying the complex-valued digital input signal in a clocked delay line (S1) up to the signal under test (AU);

comparing the amplitude value under test (AUT) that is part of the signal under test (AU) to the amplitude threshold value (SW); and marking the signal under test (AU) by a marking signal when the threshold value (SW) is exceeded.

5. A method according to claim 4, wherein said delaying step includes providing the clocked delay line in the form of a clocked shift register and said storing step includes providing the clocked memory (S2) for the determination of the ranking in the form of a clocked shift register.

6. A method according to claim 5, wherein the clocked memory (S2) is provided with more storage locations than the clocked delay line (S1).

7. A method according to claim 5, further comprising generating the amplitude values from the complex-valued digital input signal in a magnitude generator switched in upstream of the clocked memory (S2).

8. An arrangement for detecting pulses of short duration in a complex-valued digital input signal, comprising:

a clocked delay line for receiving the complex-valued digital input signal and delaying the input signal up to a signal (AU) under test;

a magnitude generator for receiving the complex-valued digital signal and generating associated amplitude values from the complex-valued digital input signal;

a clocked memory for receiving and storing a predeterminable number (N) of the amplitude values on a temporally consecutive basis;

logic means coupled to the clocked memory for selecting an amplitude value under test (AUT) from the stored amplitude values, determining a ranking of the remaining amplitude values and outputting an associated signal sample for a predeterminable rank within the ranking;

means for multiplying the associated signal sample by a predeterminable weighting factor (k) for generating an amplitude threshold value (SW); and means for comparing the amplitude value under test (AUT) that is part of the signal under test (AU) to the amplitude threshold value (SW) and outputting a marking signal (AK) if the threshold value (SW) is exceeded.

9. An arrangement according to claim 8, wherein the clocked memory has more storage locations than the clocked delay line (S1).

10. An arrangement according to claim 8, wherein said clocked delay line and said clocked memory each comprise a clocked shift register.

* * * * *